Patented Jan. 13, 1942

2,270,201

UNITED STATES PATENT OFFICE 2,270,201

N-PARATOLUENE SULPHONYL PYRIDINE CARBOXYL AMIDE AND THE PREPARATION THEREOF

William O. Frohring, Lester J. Szabo, and Maurice Landy, Cleveland, Ohio, assignors to S. M. A. Corporation, Chicago, Ill., a corporation of New Jersey No Drawing. Application January 29, 1940, Serial No. 316,228

6 Claims. (Cl. 260—295)

Sulphanilamide and sulphapyridine are both used extensively as therapeutics in the treatment of infections of the coccus type but due to their toxicity the administration thereof may be accompanied by objectionable side reactions to such an extent that dosage must be discontinued.

In addition both of these products are only sparingly soluble in water thereby increasing the difficulty of forming aqueous solutions therefrom and limiting the methods of administration.

We have discovered that N-paratoluene sulphonyl pyridine carboxyl amide may be used in place of sulphanilamide and sulphapyridine as a therapeutic in coccus infections with good results and without the objectionable side reactions of the other drugs. Our compound is soluble in water to such an extent that a solution of approximately 20% is easily formed.

As illustrative examples for the preparation of the amide, the following are given:

12.2 grams of nicotinic acid amide and 8.4 grams of sodium carbonate are dissolved in about from 25 cc. to 50 cc. of water at room temperature and 200 cc. of acetone added. To this mixture is added 19.0 grams of paratoluenesulphonyl chloride with stirring until the toluenesulphonyl acid chloride is dissolved and no more carbon dioxide is evolved. The combined solution is allowed to stand for about half an hour at room temperature and then filtered. Three times the total volume of acetone or approximately from 675 cc. to 750 cc. is then added and the sides of the container rubbed with a glass rod. The mixture is then allowed to stand until complete precipitation can be expected when crystals separate. These crystals are dissolved in the least possible amount of water at slightly above room temperature, acetone is added in an amount of from three to ten volumes as against the water of dissolution previously used and the precipitated solid filtered off.

The amide occurs as colorless needle-like plates, extremely soluble in water with a melting point of 212–3° C. (uncorrected).

The reaction is as follows:

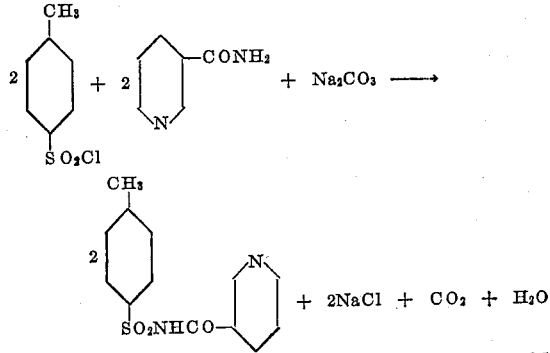

In the above compounds the nicotinic acid residue may be replaced by those of picolinic acid or isonicotinic acid to secure the corresponding picolinoyl amide and isonicotinoyl amide.

Using picolinic acid the reaction is:

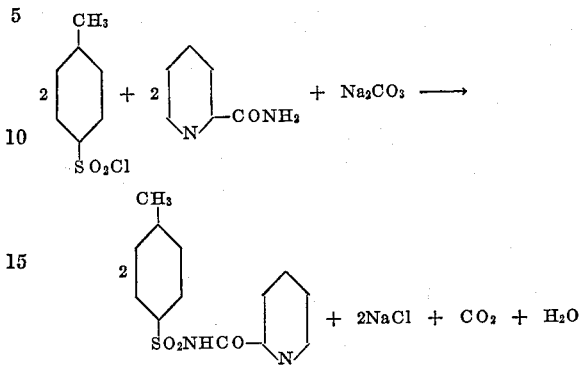

Using isonicotinic acid the reaction is:

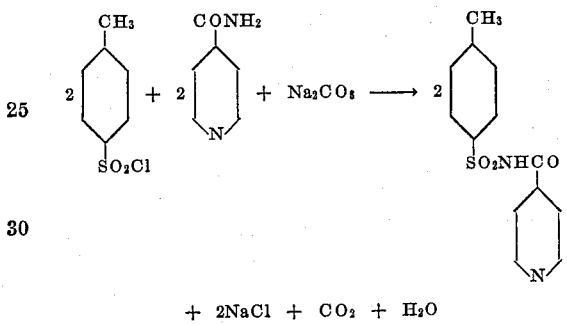

$+ 2NaCl + CO_2 + H_2O$

We claim:

1. N-paratoluene sulphonyl pyridine carboxyl amides.
2. N-paratoluene sulphonyl picolinoyl amide.
3. N-paratoluene sulphonyl isonicotinoyl amide.
4. N-paratoluene sulphonyl nicotinoyl amide.
5. The process of preparing N-paratoluene sulphonyl amides of pyridine carboxylic amides of the group consisting of picolinic, nicotinic, and isonicotinic acid amides which comprises treating the acid amide with an aqueous alkalizing agent, adding paratoluene sulphonyl chloride thereto and treating with acetone to precipitate the amide.
6. The process of preparing N-paratoluene sulphonyl amides of pyridine carboxylic amides of the group consisting of picolinic, nicotinic, and isonicotinic acid amides which comprises treating the acid amide with an aqueous solution of sodium carbonate, adding paratoluene sulphonyl chloride thereto and treating with acetone to precipitate the amide.

LESTER J. SZABO.
MAURICE LANDY.
WILLIAM O. FROHRING.